May 12, 1964        H. C. STEKETEE        3,132,678

PIE SCORER

Filed July 11, 1962

INVENTOR.
HAROLD C. STEKETEE
BY
ATTORNEYS

United States Patent Office 3,132,678
Patented May 12, 1964

3,132,678
PIE SCORER
Harold C. Steketee, 349 W. 20th St., Holland, Mich.
Filed July 11, 1962, Ser. No. 209,160
4 Claims. (Cl. 146—150)

This invention concerns pie scorers, and particularly a pie scorer of very simple construction which permits the accurate scoring of pies of many different sizes into many different numbers of equal pieces.

In the restaurant industry, it is generally deemed necessary, in the interest of customer goodwill, to divide pies very accurately into five, six, seven or eight equal sections, so that no customer will get a larger section than another for the same price. Devices for mechanically achieving equality of cut pie sections are consequently widely favored in the restaurant industry, but in view of the competitive market in that industry, the salability of such devices rests to a great degree on their simplicity, ease of operation, cleanability, and adaptability to various sizes of pies.

The present invention provides a particularly suitable pie scored in the light of the above stated requirements by providing a base, an annular pie plate support of variable dimensions, and a knife guide which can be easily and quickly but firmly clamped into place over the pie. In accordance with the invention, a section of the annular pie plate supporting member is cut away to enable the operator to grasp the flange of the pie plate and turn the pie from one cutting position to the next.

In a modified embodiment of the invention, the scorer takes the form of a cover with knife-guiding slots and internal shoulders by which the cover is supported by and centered with respect to the pie plate.

It is therefore the object of this invention to provide a simple, easily cleanable, and inexpensive pie scorer which is adaptable for use with several standard sizes of pies.

It is the object of the modified embodiment of the invention to provide a combination pie cover and scorer.

These and other objects of the invention will become apparent from the following specification, taken in connection with the accompanying drawings in which.

Figure 1:
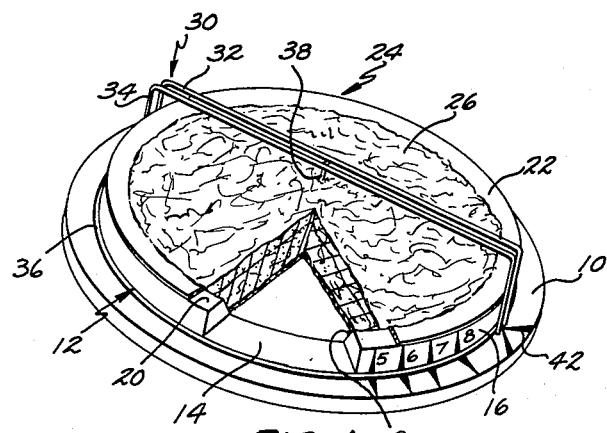
FIG. 1 is a perspective view of the pie scorer of this invention, with the pie and pie plate partly cut away.

Referring now to FIG. 1, it will be seen that the device of this invention consists of a flat base 10 on which is mounted an annular supporting member 12, a sector of which is cut away as at 14. The outer surface 16 of the annular member 12 is generally cylindrical, whereas its inner surface 8 is generally frusto-conical. The top surface 20 of the annular member 12 supports the annular flange 22 of a conventional pie pan 24 containing a pie 26. The inclination of the inner wall 18 of the annular member 12 is such that the wall 18 forms a positive support for the inclined portion 28 of the pie pan 24, so that when the pie is cut, there will be no tendency for the knife to penetrate through the thin material of the pie pan 24 along the inclined portion 28.

Figure 3:
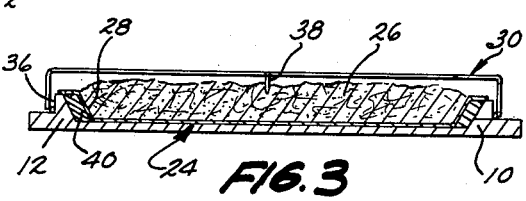
FIG. 3 is a vertical section along line III—III of FIG. 2.

Accurate cutting in the device of the invention is achieved with the help of a knife guide 30 consisting of a pair of parallel U-shaped wires 32, 34 whose ends are affixed to a wire ring 36 of a diameter just sufficient, as best seen in FIG. 3, to embrace the annular member 12 with a press fit. A center pin 38 is provided to mark the center of the pie.

Figure 2:
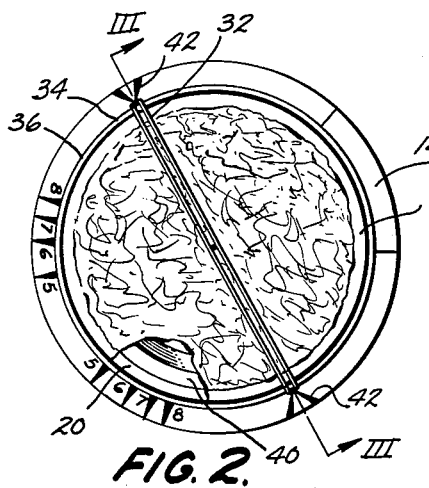
FIG. 2 is a plan view of the pie scorer of FIG. 1 but showing it in the form adapted for a smaller pie.

As will be seen more clearly from FIGS. 2 and 3, the device may be provided with auxiliary annular support members such as 40 which fit on the inside of the annular member 12 concentrically therewith and are equipped with two inclined walls, the outer wall matching the inclination of the inner wall of the main annular support member, and the inner wall of the auxiliary member matching the inclination of a standard pie pan of the size which the auxiliary member is adapted to receive. The auxiliary annular support member is also provided with a cut-out section matching the cut-out section of the main annular member to permit access to the flange of the pie pan for the purpose of turning the pie.

In use, a pie pan containing a pie is first placed into the center of the annular support member, and the knife guide 30 is then placed over the pie in a position where the legs of the U are placed on the knife guide indicia 42. A knife is then inserted between the guide wires 32, 34 starting at the center pin 38 and going outward, and a first cut is thus made. The operator then grasps the flange 22 of the pie pan 24 at the cut-out portion 14 and rotates the pie until the cut is aligned with one of the indicia 5, 6, 7 or 8, depending on whether the pie is to be cut into five, six, seven or eight sections. Then the knife is again inserted between the guide wires 32, 34, and a second cut is made. This process is then repeated until the pie has been cut in its entirety.

Although the indicia 5, 6, 7 and 8 have been shown adjacent the cut-out portion 14 in FIG. 1 for illustrative purposes, it will be understood that these indicia are normally located opposite the cut-out portion 14, as best shown in FIG. 2. A duplicate set of indicia 5, 6, 7 and 8 is preferably provided so that the device may be used with equal ease by left-handed and by right-handed persons. When the pie has been entirely cut, the guide 30 is lifted up and set aside, and the pie is ready for removal and sale.

Modification

Figure 4:
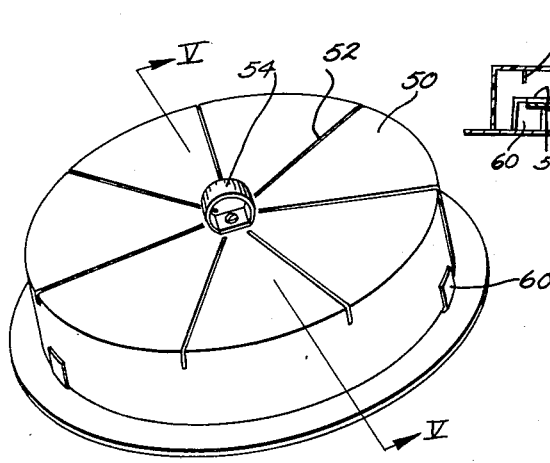
FIG. 4 is a perspective view of an alternative embodiment of the invention.
Figure 5:
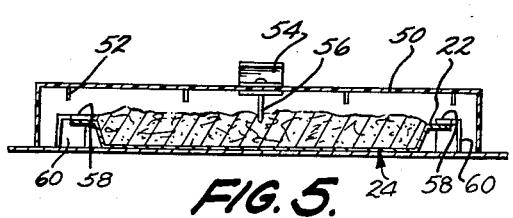
FIG. 5 is a vertical section along line V—V of FIG. 4.

In the modified embodiment of FIGS. 4 and 5, the scorer consists of a preferably transparent cover 50 in which knife guide slots 52 are formed at appropriate intervals. The cover 50 may be provided with a handle 54 and a centering pin 56. In order to properly center the cover 50 on the pie plate, inwardly extending shoulders or flanges 58 are affixed at intervals to the cover 50 by brackets 60 in such a manner that the shoulders 58 rest on the flange 22 of the pie plate 24. If desired, the brackets 60 may be inwardly inclined and made resilient so as to facilitate centering of the cover 50 on the pie plate 24.

It will be seen that the present invention discloses a simple, inexpensive, but effective and accurate pie scorer which is easy to handle by unskilled personnel and can readily be taken apart for thorough cleaning. Obviously, the concepts of the invention can be carried out in many different ways, of which the embodiments shown in the drawings and described herein are only illustrative. Conseqeuntly, I do not desire to be limited by the embodiments shown and described herein, but only by the scope of the following claims.

I claim:

1. A pie scorer capable of guiding cutting action for different sized pie cuts using the same knife guide, comprising: annular upstanding support means for supporting the flange of a flanged pie pan, a segmental arcuate portion of said annular support means being cut away to cause a flange of a support pie plate to protrude to permit an operator to grasp the flange; a removable unidirectional knife guide extending in one direction across the diameter of said support means and held fixed with respect to and in spaced alignment with respect to said annular support means; said guide being held in a position displaced angularly from said cut-away portion to allow easy grasp and movement of the pie pan flange and indicia fixedly positioned on said annular support means at a predetermined angular displacement from said knife guide means to indicate predetermined angles through which the pie pan is to be turned on said annular support means between cuts by grasping the pie pan flange at said cut-away portion to shift it.

2. The device of claim 1, in which the inner wall of said annular support means is slanted to support the frustoconical portion of said pie pan to avoid penetration of the knife therethrough when said pie is cut at said knife guide means.

3. The device of claim 2, further comprising removable additional annular support means having inclined outer and inner walls, the inclination of said outer wall matching the inclination of the inner wall of said first-mentioned annular support means, said additional annular support means having a portion cut away to match said cut-away portion of said first-mentioned annular support means, and having a diameter such as to snugly fit into said first-mentioned annular support means to adapt the device to receive a pie pan of smaller size.

4. The device of claim 1, in which the outer wall of said annular support means is vertical, and said knife guide means comprises a pair of spaced, interconnected elements having downwardly depending ends secured to a ring of an internal diameter the size of the external diameter of said annular support means to embrace said annular support means in press-fitting relationship to removably hold said knife guide means in position on said annular support means.

References Cited in the file of this patent

UNITED STATES PATENTS

| | | |
|---|---|---|
| 1,442,679 | Baker | Jan. 16, 1923 |
| 2,434,566 | Hulsman | Jan. 13, 1948 |
| 2,487,234 | Gore | Nov. 8, 1949 |
| 2,707,504 | Hill | May 3, 1955 |
| 3,075,565 | Weaver et al. | Jan. 29, 1963 |